US012726512B2

(12) United States Patent
Lewis

(10) Patent No.: US 12,726,512 B2
(45) Date of Patent: Sep. 1, 2026

(54) SYSTEMS AND METHODS FOR IDENTIFYING AND ADDRESSING MALICIOUS NETWORK TRAFFIC BASED ON NETWORK TRAFFIC LANE ACTIVITY

(71) Applicant: Stripe, LLC, South San Francisco, CA (US)

(72) Inventor: Khan Ryder Lewis, South San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 20 days.

(21) Appl. No.: 18/645,053

(22) Filed: Apr. 24, 2024

(65) Prior Publication Data

US 2025/0337774 A1 Oct. 30, 2025

(51) Int. Cl.
*H04L 9/40* (2022.01)

(52) U.S. Cl.
CPC ........ *H04L 63/1458* (2013.01); *H04L 63/166* (2013.01)

(58) Field of Classification Search
CPC ......... H04L 43/16; H04L 47/10; H04L 47/11; H04L 47/20; H04L 63/1408–1425; H04L 63/1441; H04L 63/1458; H04L 2463/141–143
See application file for complete search history.

(56) References Cited

U.S. PATENT DOCUMENTS

2012/0151593 A1* 6/2012 Kang .................... H04L 43/026 726/25
2021/0185083 A1* 6/2021 Azaria ................ H04L 63/0263
2022/0131835 A1* 4/2022 Fenton ................ H04L 63/1458

* cited by examiner

*Primary Examiner* — Kevin Bechtel
(74) *Attorney, Agent, or Firm* — Foley & Lardner LLP

(57) ABSTRACT

Disclosed herein are systems and methods for identifying and addressing malicious network traffic based on network traffic lane activity. An example method includes receiving data associated with a plurality of messages transmitted via a network, determining a first network traffic lane associated with a first set of messages of the plurality of messages and a second network traffic lane associated with a second set of messages of the plurality of messages, and determining that the first set of messages is associated with an increased probability of being involved in a distributed denial of service (DDoS) attack. In examples, the method includes causing at least one remedial action to be performed for at least a portion of messages associated with the first network traffic lane. Non-transitory machine-readable mediums are also disclosed.

17 Claims, 9 Drawing Sheets

300

300

| | Total messages received in period | Expected messages in period | Percent difference of total vs expected | Spike (difference exceeds threshold)? |
|---|---|---|---|---|
| First traffic lane | 10 | 11 | 91% | Threshold = (100 +/- 10%) NO |
| Second traffic lane | 150 | 15 | 1000% | Threshold = (100 +/- 10%) YES |

SYSTEMS AND METHODS FOR IDENTIFYING AND ADDRESSING MALICIOUS NETWORK TRAFFIC BASED ON NETWORK TRAFFIC LANE ACTIVITY

TECHNICAL FIELD

This application relates generally to systems and methods for identifying and addressing cyberattacks based on network traffic traveling along multiple network traffic lanes.

BACKGROUND

Distributed Denial of Service (DDoS) attacks involve malicious parties attempting to overwhelm service providers (DDoS targets) with unmanageable amounts of network traffic. As an example, a malicious party can use a device to generate and transmit messages to a service provider's server in an attempt to flood the server with an excessive amount of traffic. This excessive traffic absorbs system resources and can prevent legitimate messages from being processed.

To reduce susceptibility to DDoS attacks and prevent system downtime, service providers often engage third-party providers to analyze network traffic associated with a given system and filter out potentially malicious traffic. But these third-party providers often identify traffic using very coarse criteria which can inadvertently affect non-malicious parties. For example, in response to a sudden increase in traffic generated purportedly using a particular type of internet browser, the third-party provider can temporarily cause the service provider to reject or limit all traffic generated by that particular type of internet browser. These conventional techniques for guarding against DDoS attacks can be inefficient and result in unintentional denial of service to devices operated by non-malicious parties.

SUMMARY

In view of the above-noted challenges posed by malicious third parties, there is a desire for systems and methods that are capable of intelligently monitoring network traffic and addressing subsets of that network traffic (malicious network traffic) while minimizing effects on the remaining (non-malicious) network traffic.

In the present disclosure, systems and methods are disclosed that divide network traffic across multiple network traffic lanes. In some embodiments, the systems described are configured to divide messages received into a set of network traffic lanes based on criteria (referred to in combination herein as fingerprints) associated with the messages. These systems can then analyze the traffic in each network traffic lane both individually and in relation to the other network traffic lanes. In some examples, when traffic in a given network traffic lane is identified as being associated with a cyberattack (e.g., via a DDoS attack and/or the like), the systems described herein can address (e.g., temporarily disable and/or the like) network traffic on that lane in response to the detected attack.

By virtue of the implementation of the systems and methods described herein, network traffic involving a service provider and a malicious third party can be identified by the service provider's systems using more granular criteria and smaller sets of messages suspected of being involved in a given DDoS attack can be rejected. This can result in increased availability of the service provider's systems and denial of fewer non-malicious messages by the server of the service provider. And by isolating DDoS attacks to given network traffic lanes, network resources can be conserved as bandwidth and processing are directed toward non-malicious network traffic.

In an embodiment, a method includes receiving, by at least one processor, data associated with a plurality of messages transmitted via a network; determining, by the at least one processor, a first network traffic lane associated with a first set of messages of the plurality of messages, and a second network traffic lane associated with a second set of messages of the plurality of messages; determining, by the at least one processor, that the first set of messages is associated with an increased probability of being involved in a distributed denial of service (DDoS) attack; and causing, by the at least one processor, at least one remedial action to be performed for at least a portion of messages associated with the first network traffic lane based on the first set of messages being associated with the increased probability of being involved in a DDoS attack.

In examples, determining the first network traffic lane associated with the first set of messages of the plurality of messages, and the second network traffic lane associated with the second set of messages of the plurality of messages can include: determining a set of attributes for each message of the plurality of messages; determining a fingerprint for each message of the plurality of messages based on the set of attributes for each message; and determining the first set of messages and the second set of messages based on the fingerprint for each message of the plurality of messages. Determining the fingerprint for each message of the plurality of messages based on the set of attributes for each message can include concatenating, for each message of the plurality of messages, identifiers for each attribute of the set of attributes to form the fingerprint.

In some examples, attributes of the set of attributes comprise one or more of: a transport layer security (TLS) fingerprint associated with one or more messages exchanged during an initial handshake involving a client device and a server, a header fingerprint associated with data packets exchanged between the client device and the server; cookie fingerprints associated with one or more cookies stored by the client device; and/or individual fingerprints associated with the client device. In examples, the first network traffic lane is associated with a first fingerprint type, and the second network traffic lane is associated with a second fingerprint type. Determining the first set of messages can include associating each message of the plurality of messages having a fingerprint associated with the first fingerprint type with the first set of messages. Determining the second set of messages can include associating each message of the plurality of messages having a fingerprint associated with the second fingerprint type with the second set of messages.

In examples, determining that the first set of messages is associated with an increased probability of being involved in the DDoS attack includes: determining that an amount of messages associated with the first set of messages satisfies a threshold representing an unusual amount of network traffic for the first network traffic lane during a period of time. Receiving the data associated with the plurality of messages transmitted via the network can include: receiving the data associated with the plurality of messages transmitted via the network by at least one reverse proxy server.

In some examples, the method further includes determining that one or more messages of the messages associated with the first network traffic lane include unique identifiers established for client devices that transmitted the one or more messages. The method can include forgoing the at least one remedial action to be performed for a subset of messages associated with the first network traffic lane based on the presence of the unique identifier in the messages.

In another embodiment, a system includes one or more processors configured to: receive data associated with a plurality of messages transmitted via a network; determine a first network traffic lane associated with a first set of messages of the plurality of messages, and a second network traffic lane associated with a second set of messages of the plurality of messages; determine that the first set of messages is associated with an increased probability of being involved in a distributed denial of service (DDoS) attack; and cause at least one remedial action to be performed for at least a portion of messages associated with the first network traffic lane based on the first set of messages being associated with the increased probability of being involved in a DDoS attack.

In examples, the one or more processors can be configured to determine the first network traffic lane associated with the first set of messages of the plurality of messages and the second network traffic lane associated with the second set of messages of the plurality of messages can be configured to: determine a set of attributes for each message of the plurality of messages. In examples, the one or more processors can be configured to determine a fingerprint for each message of the plurality of messages based on the set of attributes for each message. The one or more processors can be configured to determine the first set of messages and the second set of messages based on the fingerprint for each message of the plurality of messages.

In some examples, the one or more processors configured to determine the fingerprint for each message of the plurality of messages based on the set of attributes for each message can be configured to concatenate, for each message of the plurality of messages, identifiers for each attribute of the set of attributes to form the fingerprint. In examples, attributes of the set of attributes include one or more of: a transport layer security (TLS) fingerprint associated with one or more messages exchanged during an initial handshake involving a client device and a server, a header fingerprint associated with data packets exchanged between the client device and the server; cookie fingerprints associated with one or more cookies stored by the client device; or individual fingerprints associated with the client device.

In examples, the first network traffic lane can be associated with a first fingerprint type, wherein the second network traffic lane is associated with a second fingerprint type. The one or more processors can be configured to determine the first set of messages are configured to: associate each message of the plurality of messages having a fingerprint associated with the first fingerprint type with the first set of messages. The one or more processors configured to determine the second set of messages can be configured to: associate each message of the plurality of messages having a fingerprint associated with the second fingerprint type with the second set of messages. The one or more processors configured to determine that the first set of messages is associated with an increased probability of being involved in the DDoS attack can be configured to determine that an amount of messages associated with the first set of messages satisfies a threshold representing an unusual amount of network traffic for the first network traffic lane during a period of time.

In some examples, the one or more processors configured to receive the data associated with the plurality of messages transmitted via the network can be configured to receive the data associated with the plurality of messages transmitted via the network by at least one reverse proxy server. The one or more processors can be further configured to determine that one or more messages of the messages associated with the first network traffic lane include unique identifiers established for client devices that transmitted the one or more messages; and forgo the at least one remedial action to be performed for a subset of messages associated with the first network traffic lane based on the presence of the unique identifier in the messages.

In yet another embodiment, a non-transitory machine-readable storage medium having computer-executable instructions stored thereon that, when executed by one or more processors, cause the one or more processors to: receive data associated with a plurality of messages transmitted via a network; determine a first network traffic lane associated with a first set of messages of the plurality of messages, and a second network traffic lane associated with a second set of messages of the plurality of messages; determine that the first set of messages is associated with an increased probability of being involved in a distributed denial of service (DDoS) attack; and cause at least one remedial action to be performed for at least a portion of messages associated with the first network traffic lane based on the first set of messages being associated with the increased probability of being involved in a DDoS attack.

In examples, the instructions that cause the one or more processors to determine the first network traffic lane associated with the first set of messages of the plurality of messages, and the second network traffic lane associated with the second set of messages of the plurality of messages cause the one or more processors to: determine a set of attributes for each message of the plurality of messages; determine a fingerprint for each message of the plurality of messages based on the set of attributes for each message; and determine the first set of messages and the second set of messages based on the fingerprint for each message of the plurality of messages.

The instructions that cause the one or more processors to determine the fingerprint for each message of the plurality of messages based on the set of attributes for each message can cause the one or more processors to: concatenate, for each message of the plurality of messages, identifiers for each attribute of the set of attributes to form the fingerprint. In some examples, attributes of the set of attributes can include one or more of: a transport layer security (TLS) fingerprint associated with one or more messages exchanged during an initial handshake involving a client device and a server, a header fingerprint associated with data packets exchanged between the client device and the server; cookie fingerprints associated with one or more cookies stored by the client device; or individual fingerprints associated with the client device.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

DETAILED DESCRIPTION

Figure 1:
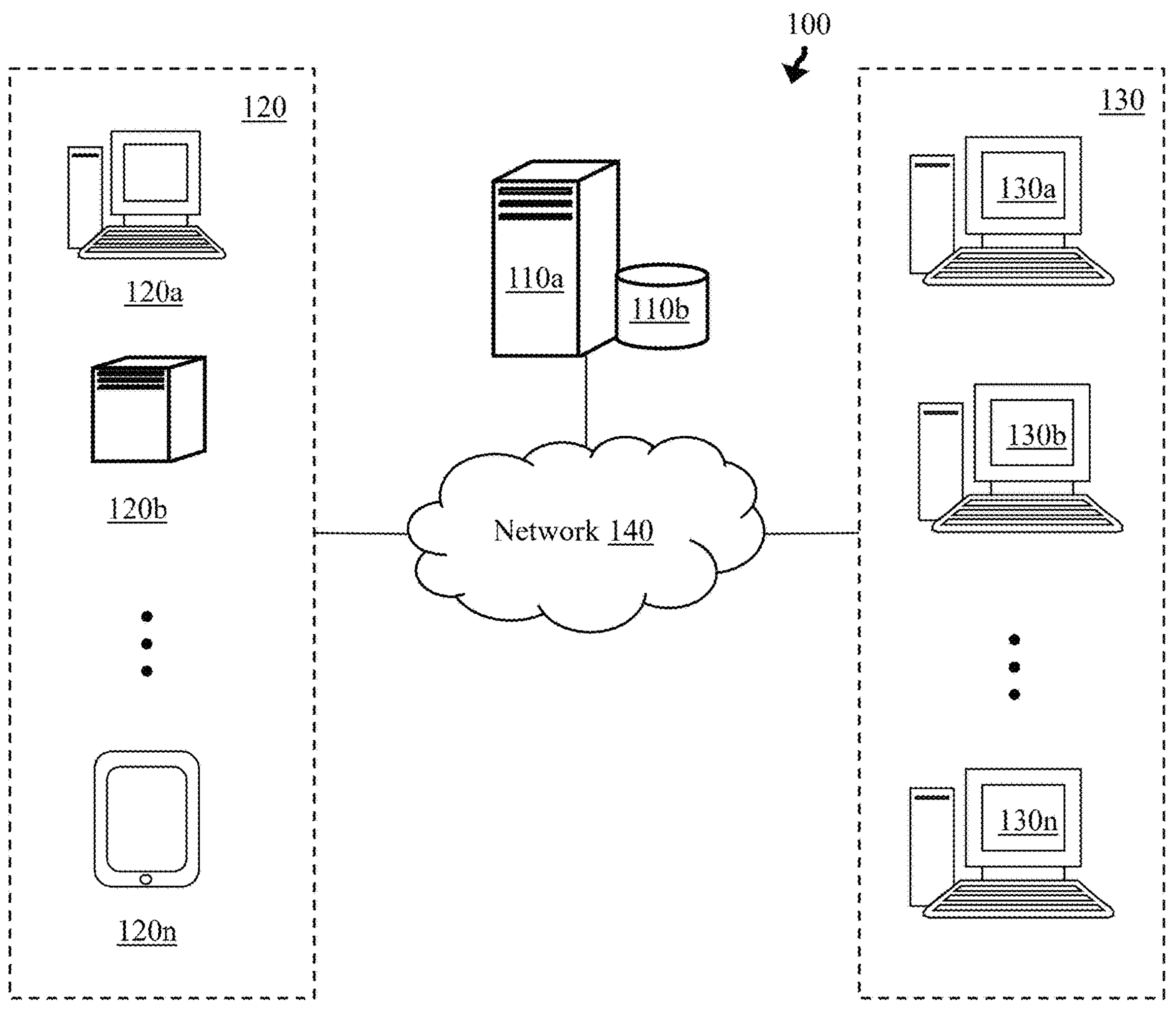
FIG. 1 illustrates various components of an example environment for identifying and addressing malicious network traffic, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments can be used and/or other changes can be made without departing from the spirit or scope of the present disclosure. The illustrative embodiments described in the detailed description are not meant to be limiting of the subject matter presented.

Described herein are systems and methods for identifying and addressing malicious network traffic based on network traffic lane activity. In examples, these systems and methods can implement techniques that involve dividing network traffic received by edge devices (that can be servers, reverse proxy servers, and/or the like hosted by a service provider) into multiple network traffic lanes (or "cohorts"). In some examples, the network traffic lanes can be divided based on one or more fingerprints associated with the end-user devices involved. The network traffic can include data or messages transmitted by end-user devices to the edge devices. The systems described herein can then determine whether a cyberattack is occurring on one or more of the network traffic lanes (e.g., a DDoS attack and/or the like) and perform remedial actions when such cyberattacks are identified. Unlike the conventional techniques described above which can affect a significant number of communications (and, in some cases, can involve all of the network traffic for a given DDoS target), the techniques implemented by the systems and methods described affect a reduced number of devices (e.g., two percent or less) when performing these remedial actions, particularly as additional network traffic lanes are tracked. It will be understood that, as the number of network traffic lanes is increased, the corresponding percentage of network traffic that is affected in response to performance of the remedial actions can be reduced to a smaller percentage than would otherwise be affected. This can enable tighter rate limits to be applied (e.g., of up to 5%, 10%, and/or the like) than may otherwise be applied if fewer network traffic lanes were being monitored (which could involve rate limits of up to 40%+ being applied). And performing remedial actions on a per-lane basis (e.g., by rejecting traffic over the lower rate limits) can limit the affects on unrelated traffic.

Further, because the techniques described herein can be implemented on systems operated by a service provider, the need for communication with a third-party provider's systems to monitor network traffic can be reduced (or even eliminated). This can conserve network and computing resources that would otherwise be consumed by transmitting data to third-parties to enable the third-parties to monitor for the cyberattacks.

FIG. 1 is a non-limiting example of an environment 100 for identifying and addressing malicious network traffic. The environment 100 includes a traffic monitoring system **110*a*. The traffic monitoring system 110*a* can use features described in FIG. 1 to obtain data, analyze the data, and permit or not permit network traffic to proceed on one or more network traffic lanes based on analyzing the data. The traffic monitoring system 110*a* can be communicatively coupled to a system database 110*b*, end-user devices 120*a-n* (collectively end-user devices 120), and service provider devices 130*a-n* (collectively service provider devices 130). It will be understood that the environment 100** is not confined to the components described herein and can include additional or other components not shown for brevity, which are to be considered within the scope of the embodiments described herein.

The above-mentioned components can be connected to each other through a network 140. Examples of the network 140 can include, but are not limited to, private or public LAN, WLAN, MAN, WAN, and the Internet. The network 140 can include both wired and wireless communications according to one or more standards and/or via one or more transport mediums. Communication over the network 140 can be performed in accordance with various communication protocols such as Transmission Control Protocol and Internet Protocol (TCP/IP), User Datagram Protocol (UDP), and IEEE communication protocols. In one example, the network 140 can include wireless communications according to Bluetooth specification sets or another standard or proprietary wireless communication protocol. In another example, the network 140 can also include communications over a cellular network, including, e.g., a GSM (Global System for Mobile Communications), CDMA (Code Division Multiple Access), and/or EDGE (Enhanced Data for Global Evolution) network.

The traffic monitoring system **110*a* can generate and display an electronic platform via a graphical user interface (GUI), the electronic platform configured to receive input associated with configuration of the traffic monitoring system 110*a*. The electronic platform can include one or more GUIs displayed on one or more of the service provider devices 130. An example of the platform generated and hosted by the traffic monitoring system 110*a*** can be a web-based application or a website configured to be displayed on various computing devices, such as mobile devices, tablets, personal computers, and the like. The platform can include various input elements configured to receive a request and data to be verified. For instance, an end-user can access the platform to upload a file, document, or other user input to be verified (e.g., when executing additional security protocols and/or the like).

The traffic monitoring system **110*a* can be any computing device comprising a processor and non-transitory, machine-readable storage capable of executing the various tasks and processes described herein. The traffic monitoring system 110*a* can employ various processors such as a central processing unit (CPU) and graphics processing unit (GPU), among others. Non-limiting examples of such computing devices can include workstation computers, laptop computers, server computers, and the like. In some embodiments, the traffic monitoring system 110*a* can be included and/or implemented by one or more of the service provider devices 130. In some embodiments, the traffic monitoring system 110*a*** can be associated with a service provider that processes network traffic involved in one or more payment transactions.

The traffic monitoring system 110*a* can use one or more application programming interfaces (APIs) to communicate with one or more of the computing devices described herein. For instance, the traffic monitoring system 110*a* can utilize one or more APIs to automatically transmit/receive data to/from the service providers 130 to enable the traffic monitoring system 110*a* to monitor network traffic in accordance with the techniques described herein. In this instance, the API can be associated with (e.g., hosted by) the traffic monitoring system 110*a* and configured to transmit the data to the traffic monitoring system 110*a*.

End-user devices 120 can represent any computing device comprising a processor and a non-transitory, machine-readable storage medium capable of performing the various tasks and processes described herein. Non-limiting examples of an end-user device 120 include workstation computers, laptop computers, phones, tablet computers, server computers, virtual machines hosted by a computing device, and/or the like. During operation, various users (e.g., customers, individuals associated with issuing banks, merchants, individuals associated with acquiring banks, and/or the like) can use end-user devices 120 to access the platform operationally managed by the traffic monitoring system 110*a*. In some embodiments, the end-user devices 120 can be operated by one or more types of end-users. For example, the end-user devices 120 can be operated by individuals, groups of individuals (e.g., employees), and/or the like involved in one or more transactions. In examples, end-user devices 120 can be used by individuals such as malicious parties attempting to initiate cybersecurity attacks (cyberattacks). As an example, an end-user device 120 can be used by a malicious party to initiate and perform a DDoS attack directed at one or more of the service provider devices 130.

Service provider devices 130 can include one or more computing devices comprising a processor and non-transitory, machine-readable storage capable of executing the various tasks and processes. The service provider devices 130 can also comprise computing such as, for example, servers managing, hosting, or otherwise involved in the operation of a database. For ease of description, FIG. 1 refers to all the components depicted as service providers 130. In some embodiments, the service providers 130 are associated with a financial services provider that can offer payment processing services that are processed at least in part by one or more of the computing devices of the environment 100 of FIG. 1.

As described herein, the traffic monitoring system 110*a* can implement various methods to analyze network traffic involving one or more end-user devices 120 and one or more service provider devices 130. For example, the traffic monitoring system 110*a* can identify one or more messages transmitted from the end-user devices 120 to one or more of the service provider devices 130. The traffic monitoring system 110*a* can then determine that each message of the one or more messages is associated with at least one network traffic lane. For example, the traffic monitoring system 110*a* can determine that a first set of messages is associated with a first network traffic lane based on one or more attributes for each message of the first set of messages, that a second set of messages is associated with a second network traffic lane based on one or more attributes for each message of the second set of messages, and so on. In some embodiments, as the traffic monitoring system 110*a* determines that messages transmitted along a given network traffic lane are involved in, or potentially involved in, a cyberattack, the traffic monitoring system 110*a* can cause at least one remedial action to be performed. Non-limiting examples of remedial actions can include instituting a rate limit on one or more network traffic lanes, causing network traffic along a network traffic lane to be suspended, denied, and/or the like, for a period of time. In this way, the traffic monitoring system 110*a* can address cyberattacks (e.g., DDoS attacks) and reduce the effects of such an attack on the service provider devices 130 without affecting unrelated network traffic that is not involved, or is not likely involved, in the cyberattacks.

Figure 2:
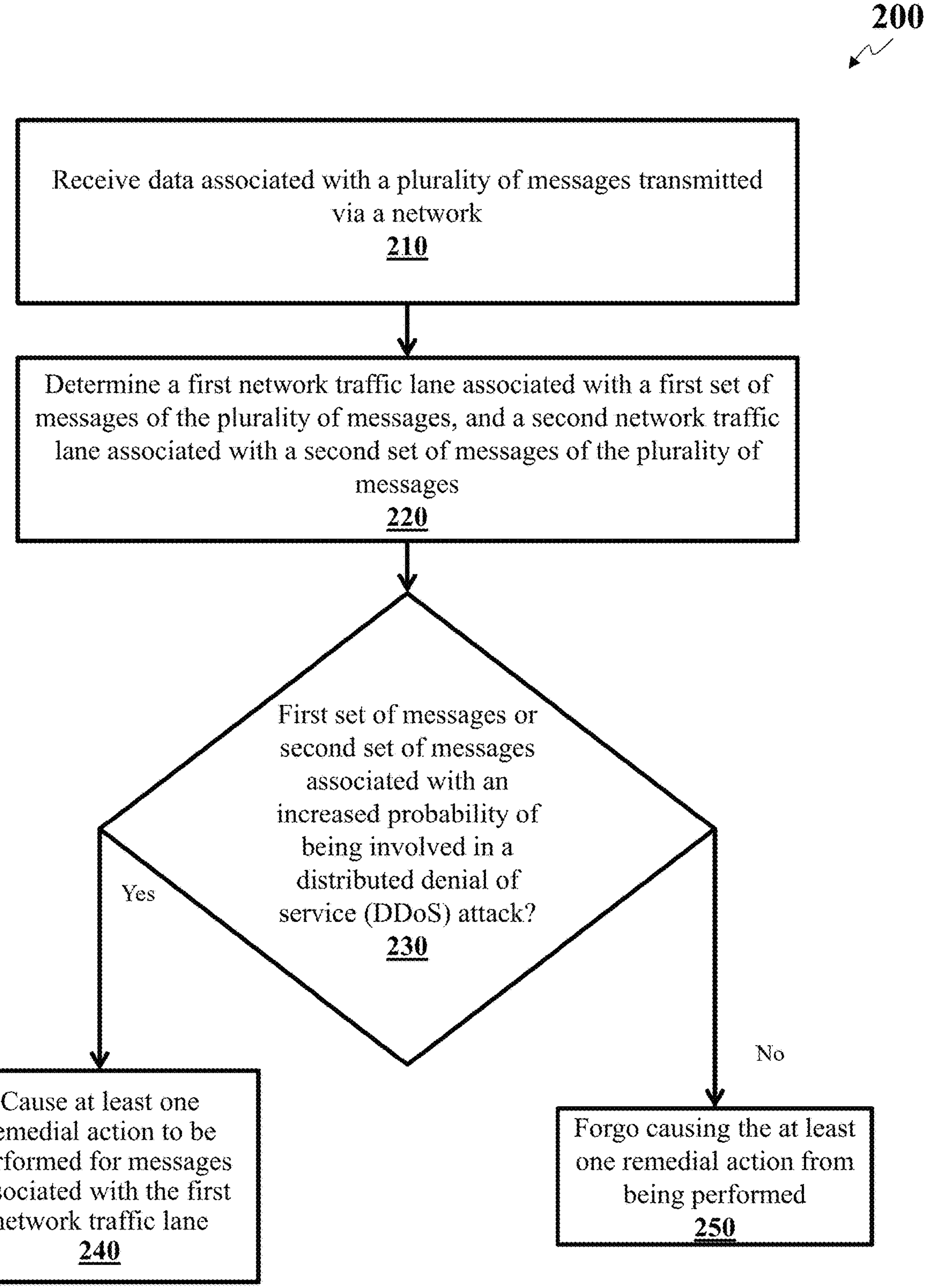
FIG. 2 illustrates a flow diagram of a process executed by a traffic monitoring system, according to an embodiment.
Figure 3A:
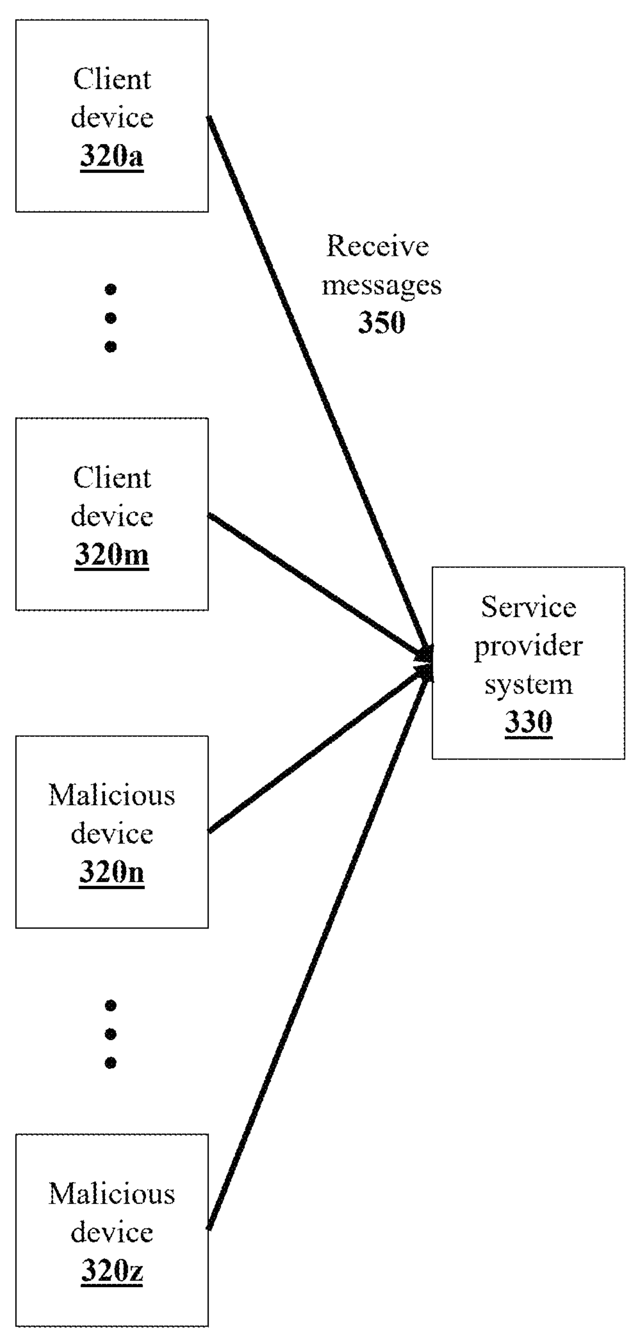
FIGS. 3A-3E are diagrams of an implementation of systems and methods involved in identifying and addressing malicious network traffic based on network traffic lane activity according to an embodiment.
Figure 3B:
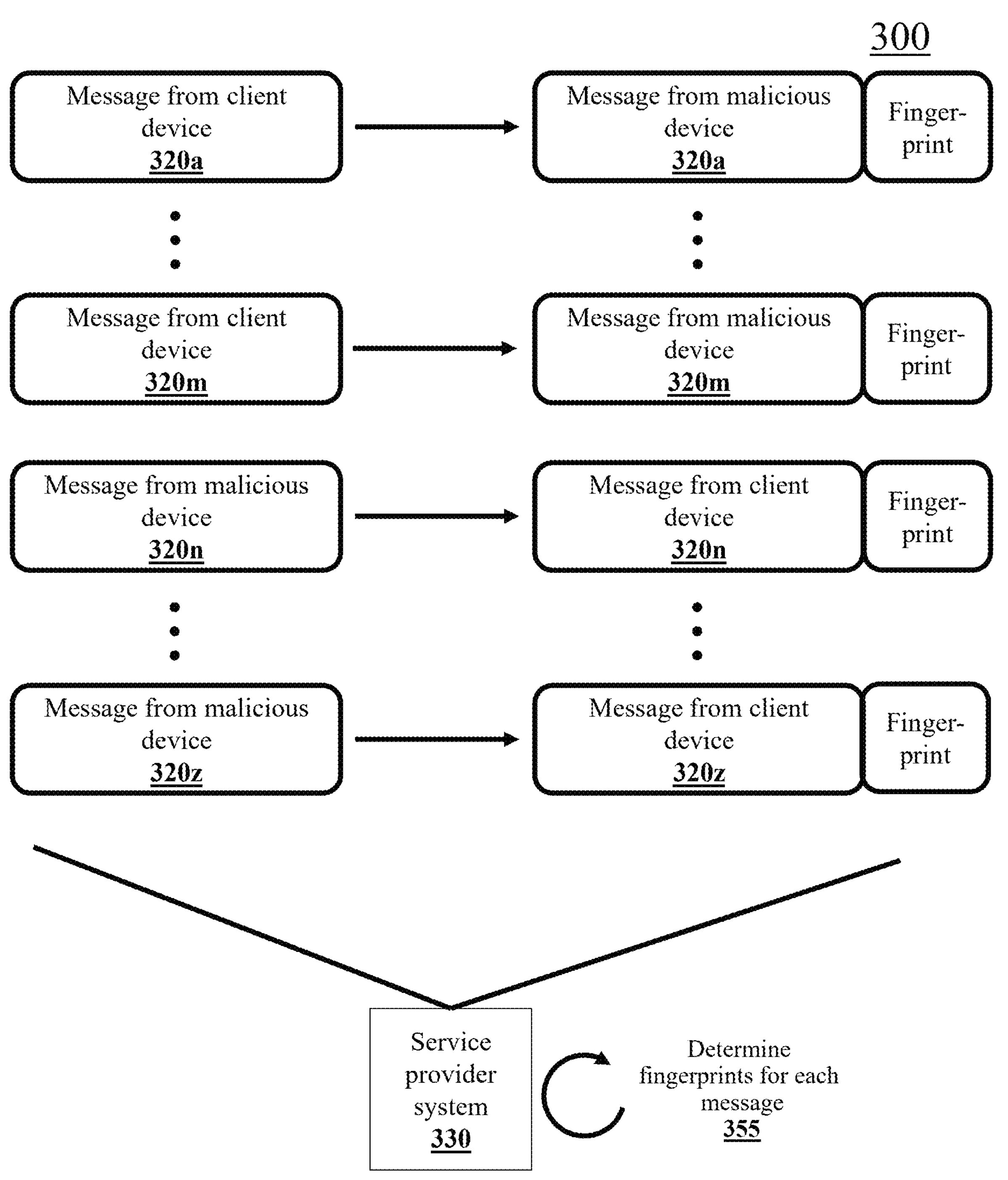
Figure 3C:
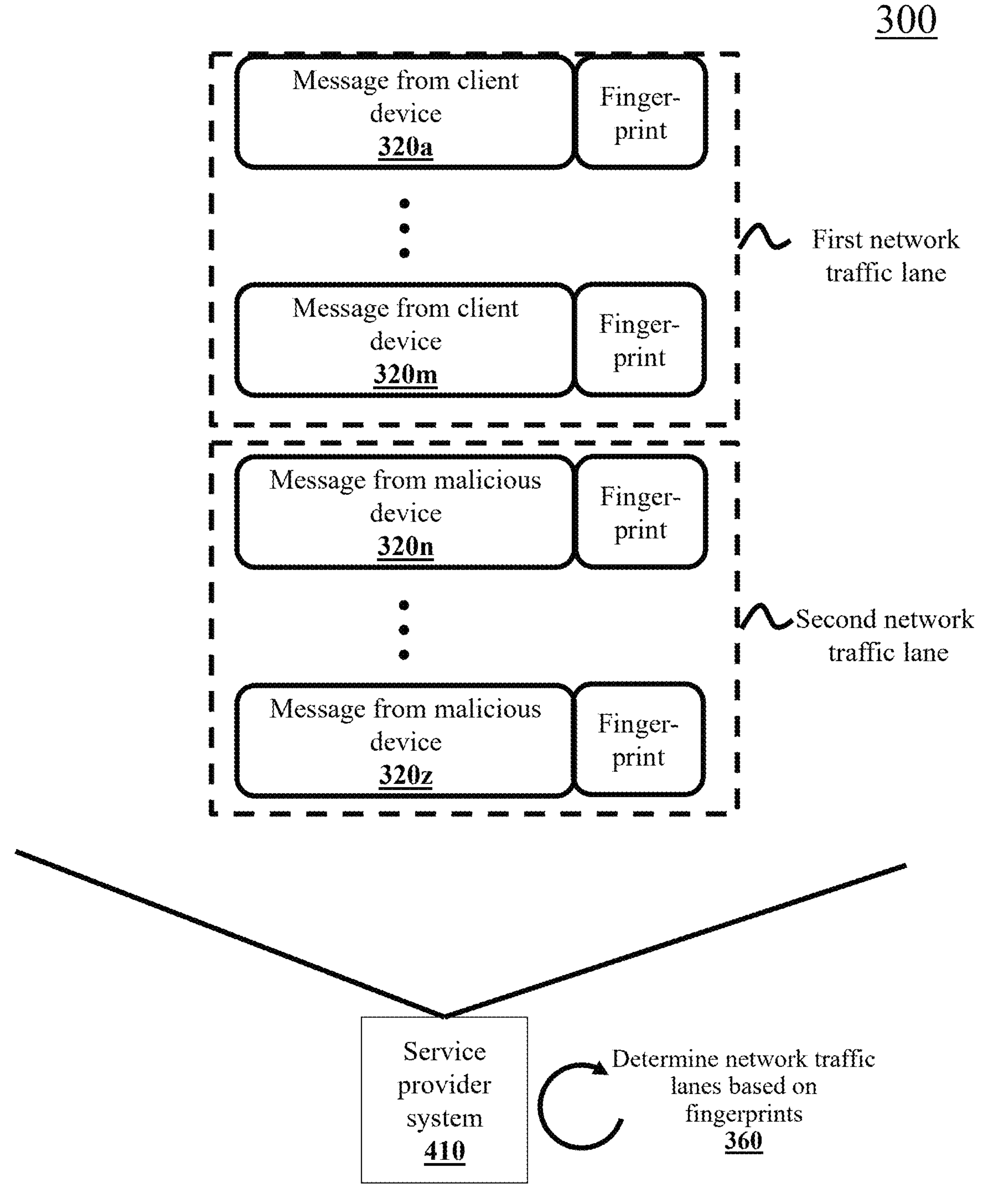
Figure 3D:
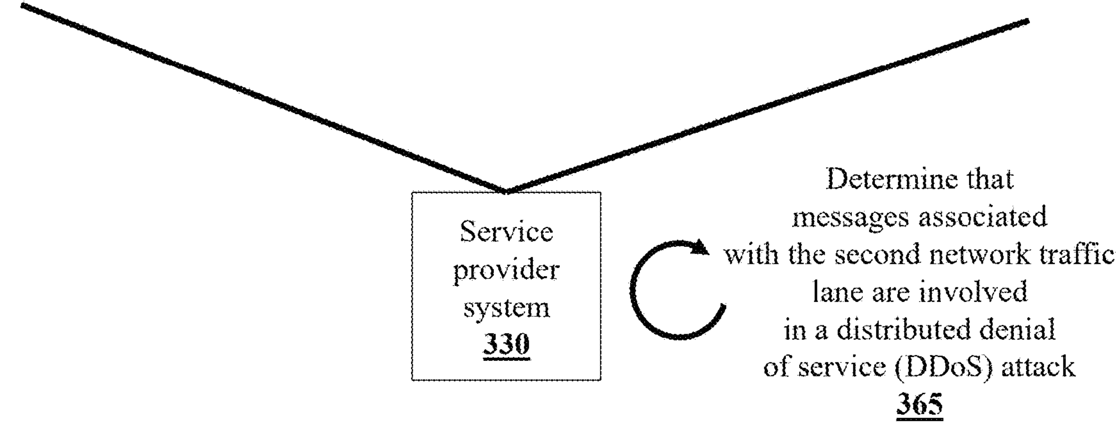
Figure 3E:
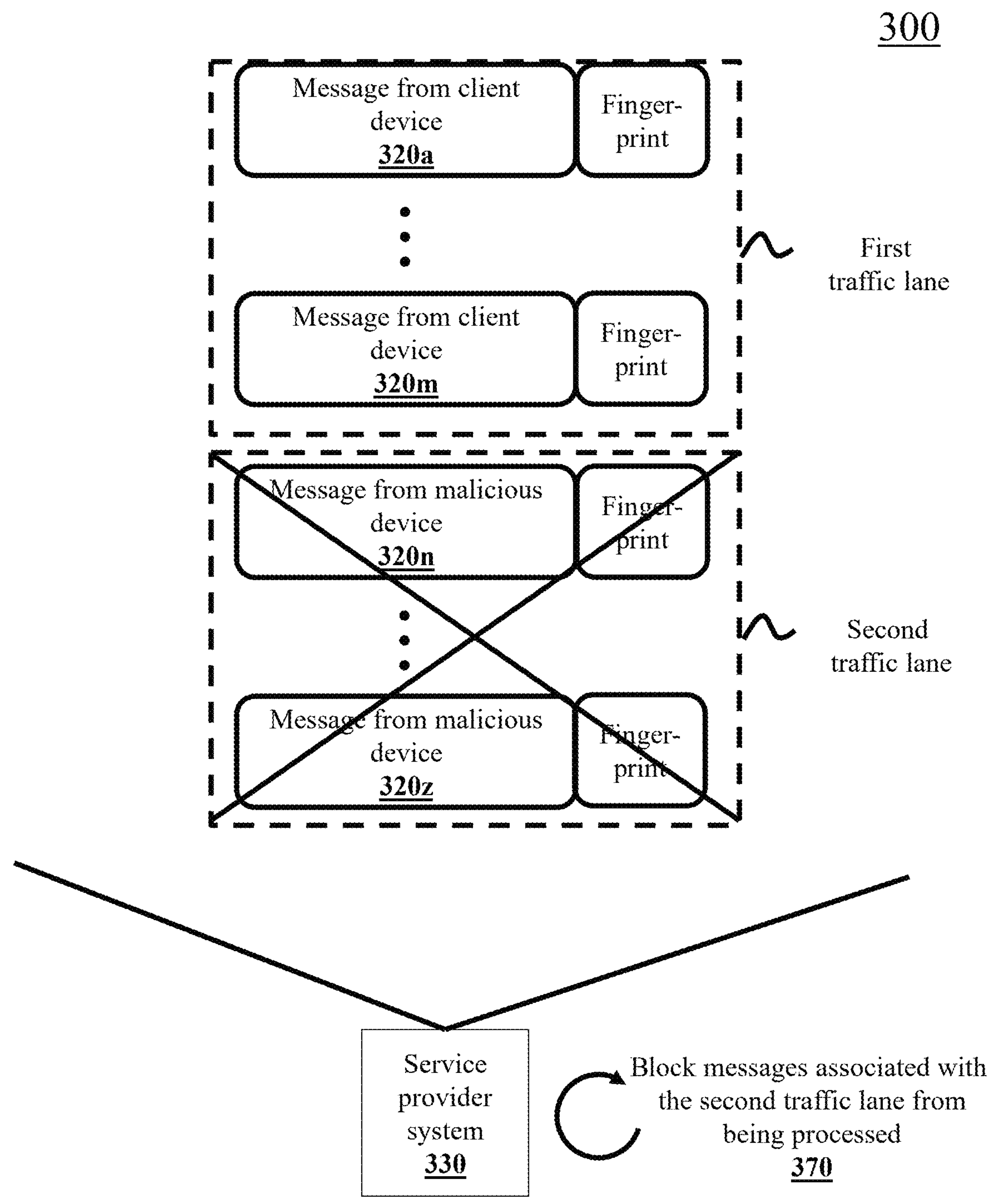

FIG. 2 illustrates a flow diagram of a process 200 executed by a traffic monitoring system. The process 200 includes operations 210-250. However, other embodiments can include additional or alternative operations or can omit one or more operations altogether. The process 200 is described as being executed by a traffic monitoring system that is the same as, or similar to, the traffic monitoring system 110*a* described in FIG. 1. However, one or more operations of process 200 can also be executed by any number of computing devices operating in the distributed computing system described in FIG. 1. For instance, one or more computing devices (e.g., computing devices that can be the same as, or similar to, the end user devices 120 and/or the service provider devices 130) can perform some or all of the operations described in FIG. 2 alone or in cooperation with one or more other computing devices of FIG. 1. Using the methods and systems described herein, such as the process 200, the traffic monitoring system can identify cyberattacks along various network traffic lanes and address such cyberattacks in a manner that reduces or eliminates the effects of the remedial actions on network traffic not involved in the cyberattacks.

At operation 210, the traffic monitoring system receives data associated with a plurality of messages transmitted via a network. For example, the traffic monitoring system can receive the data associated with the plurality of messages transmitted via the network from one or more service provider devices. In this example, the one or more service provider devices can be as involved in providing one or more electronic services. Examples of electronic services can include, without limitation, communication services involving exchanges of messages between end-user devices and service provider devices, network security and performance services involving management of data communication between end-user devices and service provider devices, and service provider devices, payment processing services involving facilitating online transactions by securing payment authorization and electronic transfers between users (e.g., customers) operating end-user devices and merchants operating service provider device(s), and/or the like.

In some embodiments, the traffic monitoring system can receive the data associated with the plurality of messages from at least one reverse proxy server. For example, one or more of the service provider device(s) can be associated with (e.g., include, be in direct or indirect communication with, and/or the like) a reverse proxy server that intercepts data transmitted from the end-user device(s) to the service provider devices(s). In this example, the reverse proxy server can gather the data associated with the plurality of messages (e.g., the plurality of messages, metadata determined based on the plurality of messages, and/or the like) and transmit the data associated with the plurality of messages to the traffic monitoring system. While described as separate devices, it will be understood that the reverse proxy server and/or the traffic monitoring system (or the techniques disclosed herein that are implemented by the reverse proxy server and/or the traffic monitoring system) can be included in or implemented by the one or more service provider devices.

In some embodiments, the one or more messages transmitted via the network can include messages transmitted by end-user devices that are associated with (e.g., controlled by) users such as individuals expected to be interacting with respective end-user devices. In some examples, the one or more messages can include messages transmitted by end-user devices that are similarly associated with users, where such users include malicious parties attempting to perform cyberattacks on the service provider device(s). In examples, the malicious parties can provide input to the respective end-user devices to cause messages to be transmitted to service provider devices in an attempt to overwhelm the service provider devices with unmanageable amounts of network traffic.

At operation 220, the traffic monitoring system determines a first network traffic lane associated with a first set of messages of the plurality of messages, and a second network traffic lane associated with a second set of messages of the plurality of messages. For example, the traffic monitoring system can determine the first network traffic lane based on attributes of each of the messages of the first set of messages, and the traffic monitoring system can determine the second network traffic lane based on attributes of each of the messages of the second set of messages. Although aspects of the present disclosure are described with respect to two network traffic lanes, it will be understood that the traffic monitoring system can determine more or fewer network traffic lanes are present based on the attributes of messages received at a given point in time or a given period of time.

In some examples, the traffic monitoring system can determine the attributes of each of the messages. For example, the traffic monitoring system can determine the attributes of each of the messages based on (e.g., in response to) the traffic monitoring system receiving each of the messages. Examples of attributes can include, without limitation, transportation layer security (TLS) fingerprints (e.g., JA3 fingerprints and/or the like), header fingerprints, cookie fingerprints, individual fingerprints (e.g., device- or application-specific fingerprints), and/or the like.

The traffic monitoring system can determine the TLS fingerprints based on data transmitted by the end-user device transmitting a given message during an initial handshake process between an end-user device and a service provider device. For example, the traffic monitoring system can determine the TLS fingerprints based on a message (e.g., a "hello message") generated by a given end-user device to initiate a handshake between the end-user device and the service provider device. The traffic monitoring system can extract information based on the message such as, for example, cipher suites supported by the end-user device (or an application executed by the end-user device), extensions enabled by an application (e.g., a browser or application) of the end-user device, a TLS version associated with the end-user device, and/or the like. In some embodiments, the traffic monitoring system can provide the information extracted from the message to a hashing algorithm to cause the hashing algorithm to generate a unique string that is used by the traffic monitoring system as the TLS fingerprint for the end-user device.

The traffic monitoring system can determine the header fingerprints based on data associated with headers (e.g., hypertext transfer protocol (HTTP) headers) of messages (e.g., request(s) and/or response(s)) from the end-user device. For example, the traffic monitoring system can determine the header fingerprints based on data associated with one or more fields of the headers of the messages. Examples of the fields can include the application making the request (e.g., a specific web browser and/or the like), application (e.g., software and/or mobile application and/or the like), a referer specifying a webpage that referred a user or where requested resources are being used, language indicating the preferred language associated with the end-user device, compression formats that are compatible with the end-user device, an indication of the presence or absence of one or more HTTP headers, and/or the like. In some embodiments, the traffic monitoring system can extract values corresponding to the header fields and process the extracted values to generate the header fingerprint. In examples, the traffic monitoring system can process the extracted values by concatenating the values, ordering and weighing the values, providing the values to a hashing algorithm to cause the hashing algorithm to generate an output string that is used as the header fingerprint, and/or the like.

The traffic monitoring system can determine the cookie fingerprints based on one or more cookies stored on an end-user device associated with a given message. For example, the traffic monitoring system can receive data from a web browser of a given end-user device, the data associated with previous visits by the browser web browser of the end-user device (referred to as a "cookie"). In this example, the web browser can include a cookie that was previously stored on the end-user device by the service provider device. Cookies can include, for example, a name, a value (e.g., representing preferences of the user operating the end-user device or login information), an expiration date for the cookie, a path (e.g., specifying a part of a website hosted by the service provider device that corresponds to the cookie), a secure flag indicating that the cookie is only to be transmitted over a secured connection, and/or the like. In examples, the traffic monitoring system can process the cookies and determine the cookie fingerprints based on the values associated with the cookies. In some examples, the traffic monitoring system can determine a cookie fingerprint based on one or more cookies being present or not present. For example, in cases where one or more cookies that are expected are determined to be present, the traffic monitoring system can generate a cookie fingerprint that causes the data associated with the end-user device to be included in the a of messages that similarly include the cookies. In cases where one or more cookies that are expected are determined to not be present, the traffic monitoring system can generate cookie fingerprints that cause the data associated with the end-user device to be included in a set of messages that similarly do not include the cookies. In this way, the traffic monitoring system can generate cookie fingerprints that cause data transmitted by end-user devices controlled by malicious parties (e.g., mimicking a real browser in an attempt to cause the traffic monitoring system to determine TLS fingerprints or header fingerprints that would otherwise be associated with real browsers) to be segmented and directed to traffic lanes separate from the traffic lanes carrying non-malicious messages.

The traffic monitoring system can determine the individual fingerprints (e.g., device- or application-specific fingerprints) based on data stored on, or provided by, the end-user devices. For example, the traffic monitoring system can determine the individual fingerprints based on the hardware installed in the end-user device (e.g., processors, graphics cards, system fonts installed on the end-user device, and/or the like) or data collected by software executed by the end-user devices (e.g., collected in association with execution of a Javascript library and/or the like on end-user devices to capture and transmit the information described herein to the traffic monitoring system). In examples, the traffic monitoring system can process the data associated with the end-user device described herein and determine the individual fingerprints based on the processed data.

In some embodiments, the traffic monitoring system can determine a fingerprint for a given end-user device based on one or more sets of the attributes described herein. For example, the traffic monitoring system can receive the data associated with the plurality of messages and determine one or more of the attributes (e.g., the TLS fingerprints, header fingerprints, cookie fingerprints, individual fingerprints, and/or the like) for each of the messages of the plurality of messages. In this example, the traffic monitoring system can determine a fingerprint by concatenating one or more of the attributes to form the fingerprint. In some embodiments, the traffic monitoring system can determine the fingerprint for the end-user devices by determining identifiers for each of the attributes. For example, the traffic monitoring system can determine the fingerprint for the end-user devices by determining identifiers for each of the attributes and processing each of the attributes to determine the fingerprint. In an example, the traffic monitoring system can, for each message, concatenate the identifiers for each attribute of the set of attributes to form the fingerprint for each corresponding end-user device.

In some embodiments, the traffic monitoring system can determine the first set of messages and the second set of messages based on the fingerprints for the end-user devices, where the fingerprints are associated with a first fingerprint type or a second fingerprint type. In one example, the traffic monitoring system can determine a first set of fingerprints corresponding to end-user devices communicating with the service provider device that indicate the end-user devices are using a first internet browser, and the traffic monitoring system can determine a second set of fingerprints corresponding to end-user devices communicating with the service provider device that indicate the end-user devices are using a second internet browser. In this example, the traffic monitoring system can determine that the set of fingerprints indicating the end-user devices are using a first internet browser include fingerprints having a first fingerprint type, and that the set of fingerprints indicating the end-user devices are using a second internet browser include fingerprints having a second fingerprint type. The traffic monitoring system can then associate the messages having fingerprints including the first fingerprint type as being associated with (e.g., included in) the first set of messages and associate the messages having fingerprints including the second fingerprint type as being associated with the second set of messages. In this way, the traffic monitoring system can associate the fingerprints (and correspond end-user devices) as communicating with the service provider device along various network traffic lanes with varying degrees of granularity.

At operation 230, the traffic monitoring system determines whether the first set of messages or second set of messages is associated with an increased probability of being involved in a cyberattack such as, for example, a DDoS attack. For example, the traffic monitoring system can determine whether the first set of messages or the second set of messages is associated with an increased probability of being involved in a cyberattack based on the attributes (e.g., fingerprints and/or the like) of one or more of the messages of the first set of messages or the second set of message. In an example, the traffic monitoring system can determine that the first set of messages include one or more messages that are associated with a cyberattack based on a volume of the first set of messages received at a point in time or a period of time. In this example, the volume of messages can be compared to a threshold value (e.g., an expected or unusual number of messages for a given network traffic lane to be received over a period of time indicating that a cyberattack is occurring) to determine whether the volume of messages satisfies the threshold value. In another example, the traffic monitoring system can determine that one or more messages of the first set of messages are transmitted by an end-user device corresponding to an IP address involved in one or more cyberattacks (e.g., current or previous cyberattacks). The traffic monitoring system can then determine that the first set of messages is associated with an increased probability of being involved in the cyberattack based on one or more of the messages of the first set of messages corresponding to the IP addresses involved in the one or more cyberattacks.

In embodiments where the traffic monitoring system determines that the first set of messages or the second set of messages are associated with an increased probability of being involved in the cyberattack ("YES" at 230), the traffic monitoring system can cause at least one remedial action to be performed. In embodiments where the traffic monitoring system determines that the first set of messages or the second set of messages are not associated with an increased probability of being involved in the cyberattack ("NO" at 230), the traffic monitoring system can forgo causing the at least one remedial action from being performed. And as described below, where the traffic monitoring system determines that the first set of messages or the second set of messages are associated with an increased probability of being involved in the cyberattack, the traffic monitoring system can determine to forgo the at least one remedial action based on the traffic monitoring system analyzing one or more of the messages transmitted by the end-user devices along the corresponding network traffic lane.

At operation 240, the traffic monitoring system causes at least one remedial action to be performed. For example, in response to determining that one or more messages associated with the first network traffic lane are associated with an increased probability of being involved in a cyberattack ("YES" at 230), the traffic monitoring system can suspend transmission of the messages along the first network traffic lane. In this example, transmission can be suspended for a predetermined number of messages, a predetermined period of time, and/or the like. In examples, transmission can be suspended until the traffic monitoring system determines that the messages are no longer associated with a cyberattack.

In examples where the traffic monitoring system determines that one or more messages associated with the first network traffic lane and the second network traffic lane are associated with an increased probability of being involved in a cyberattack, the traffic monitoring system can cause the remedial action to be performed for messages transmitted along each corresponding network traffic lane. In this way, the traffic monitoring system can ensure that the corresponding service provider devices are protected against cyberattacks originating from multiple end-user devices having multiple fingerprints. In other examples, end-user devices can provide earlier-stored cookies indicating that the end-user devices are known to be associated with non-malicious parties. In these examples, the end-user devices with these cookies can be associated with a network traffic lane that is assigned to end-user devices having similar cookies. In this way, the traffic monitoring system can forgo performing the remedial action, even in cases where the network traffic of the network traffic lane would indicate the messages have a higher probability of being associated with cyberattacks. This can further reduce the chance that such messages are rate limited due to attacker traffic.

At operation 250, the traffic monitoring system forgoes causing at least one remedial action to be performed. For example, in response to determining that one or more messages associated with the first network traffic lane are not associated with an increased probability of being involved in a cyberattack ("NO" at 230), the traffic monitoring system can forgo suspending transmission of the messages along the first network traffic lane. Additionally, or alternatively, in examples where one or more of the messages associated with the first network traffic lane are determined to be associated with an increased probability of being involved in a cyberattack, the traffic monitoring system can further analyze the messages involved. In these examples, the traffic monitoring system can then determine if one or more messages are not involved in a cyberattack. For example, the traffic monitoring system can identify one or more attributes that indicate the messages are not involved in a cyberattack. An example of an attribute indicating that the messages are not involved in the cyberattack can include a unique identifier that is identified for the end-user device(s) being present in data transmitted by the end-user device(s). Another example of an attribute indicating that the messages are not involved in the cyberattack can include the unique fingerprint being present in corresponding data transmitted by the end-user devices (e.g., not repeated across multiple messages). In some embodiments, the traffic monitoring system can determine that the one or more messages are not involved in the cybersecurity attack and forgo causing the at least one remedial action to be performed.

FIGS. 3A-3E illustrate a non-limiting example of an implementation 300 of systems and methods involved in identifying and addressing malicious network traffic based on network traffic lane activity. In some embodiments, one or more of the computing devices may be the same as, or similar to, one or more of the computing devices of FIG. 1. For example, one or more of the client devices **320*a*-320*m* can be the same as, or similar to, the end-user devices 120 of FIG. 1, and the service provider system 330 can be the same as, or similar to, the service provider system 130 of FIG. 1**.

As shown by operation 350, the service provider system 330 can receive messages from the client devices **320*a-m* and malicious devices 320*n*-320*z*. In this example, the messages received from the client devices 320*a*-320*m* can be associated with normal traffic, and the messages received from the malicious devices 320*n*-320*z* can be associated with one or more DDoS attacks. Each of the messages received by the service provider system 330** can be associated with one or more attributes such as, for example, a TLS fingerprint, a full JA3 fingerprint, one or more header fingerprints, one or more cookie fingerprints, one or more optional header fingerprints, and/or the like.

As show by operation 355, the service provider system 330 can determine fingerprints for each message. For example, the service provider system 330 can determine fingerprints for each message based on attributes associated with the messages (e.g., attributes corresponding to the devices that transmitted the messages). In some embodiments, the fingerprints can include a hash. For example, the service provider system 330 can provide values corresponding to the attributes of each message to a hashing algorithm to generate, for example, SHA256 fingerprints. The values can correspond to the TLS fingerprint, the full JA3 fingerprint, the one or more header fingerprints, the one or more cookie fingerprints, the one or more optional header fingerprints, and/or the like. In some embodiments, the service provider system 330 can include machine identifiers and/or private machine identifiers that are unique when generating the fingerprints, improving distribution of the fingerprints across the number of possible network traffic lanes.

As shown by operation 360, the service provider system 330 can determine network traffic lanes based on the fingerprints for each message. For example, using the SHA256 fingerprint, the service provider system 330 can determine at least a first network traffic lane and a second network traffic lane of 4096 total traffic lanes (not all shown for purposes of clarity). In examples where the hashes are generated based on the machine identifiers and/or the private machine identifiers, the distribution of messages by fingerprints can be improved even further across lanes for legitimate users even if these users share the same browser version and operating system. In some embodiments, traffic lane assignments can be based on solely on signed browser cookies that are set by the edge device (e.g., the service provider system 330) (for requests that are sent from a web browser), and fall back to network fingerprints only in the absence of a cookie.

As shown by operation 365, the service provider system 330 can determine that messages associated with the second network traffic lane are involved in a DDoS attack. For example, the service provider system 330 can compare the total messages received during a period of time to the number of expected messages for that period of time to determine a percent difference. Where the percent difference satisfies a threshold value (e.g., +/−10%) the service provider system 330 can determine that the corresponding network traffic lane is involved in a DDoS attack.

As shown by operation 370, the service provider system 330 can perform a remedial action by blocking messages associated with the second traffic lane from being processed. The service provider system 330 can block the messages based on the service provider system 330 determining that the second network traffic lane is involved in a DDoS attack.

In examples, the service provider system 330 can apply a rate limit to the second network traffic lane. For example, a low-request per second (RPS) rate limit can be applied for network traffic lanes that are historically less likely to be involved in a DDoS attack when compared to other network traffic lanes, and a higher RPS rate limit can be applied for network traffic lanes that have been historically DDoS targets. In examples, these network traffic lanes (and the corresponding application of rate limits) can be applied to provide defense among a cluster of network traffic lanes. In some embodiments, in a global attack, each cluster can apply similar rate limits to one another so as to reduce traffic to enable the service provider system 330 to handle such network traffic. By applying remedial actions separately based on fingerprints, a single attacker fingerprint can't consume a full network traffic lane.

Figure 4:
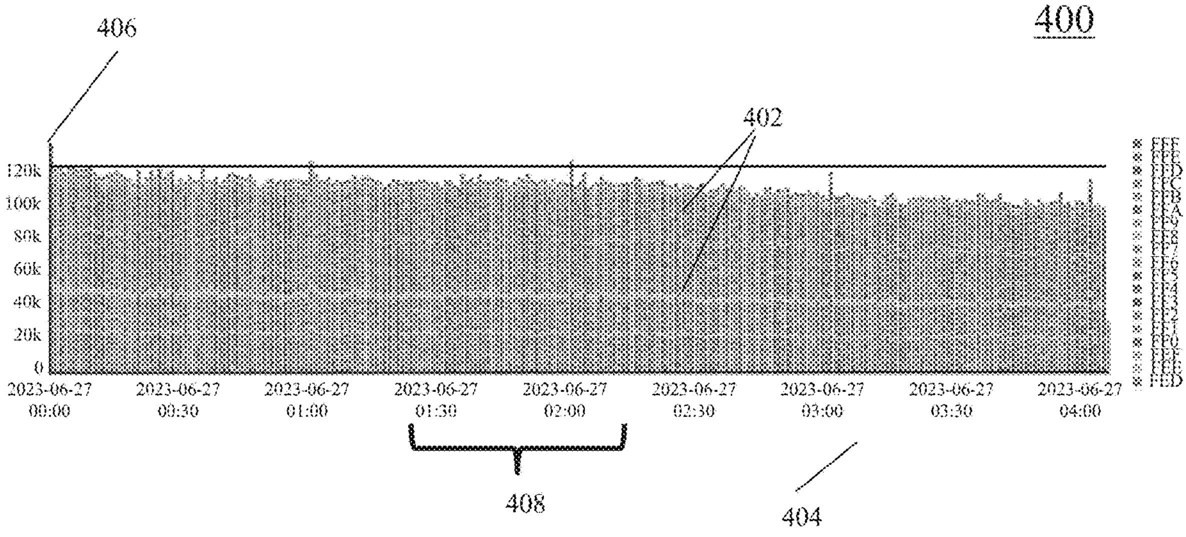
FIG. 4 illustrates network traffic along multiple network traffic lanes, according to an embodiment.

FIG. 4 illustrates network traffic along multiple network traffic lanes. As illustrated, a plurality of network traffic lanes 400 can be formed, with each individual lane 402 being measured in a volume of messages 406 received at points in time 404 or periods of time 408. In this illustrated example, the network traffic lanes can be divided in accordance with the techniques described herein based on a plurality of fingerprints. As will be appreciated, in cases where a sharp increase in network traffic is experienced as a result of a DDoS attack, one network traffic lane will be greater in proportion to the others (particularly when the network traffic lanes are balanced as described herein).

Figure 5:
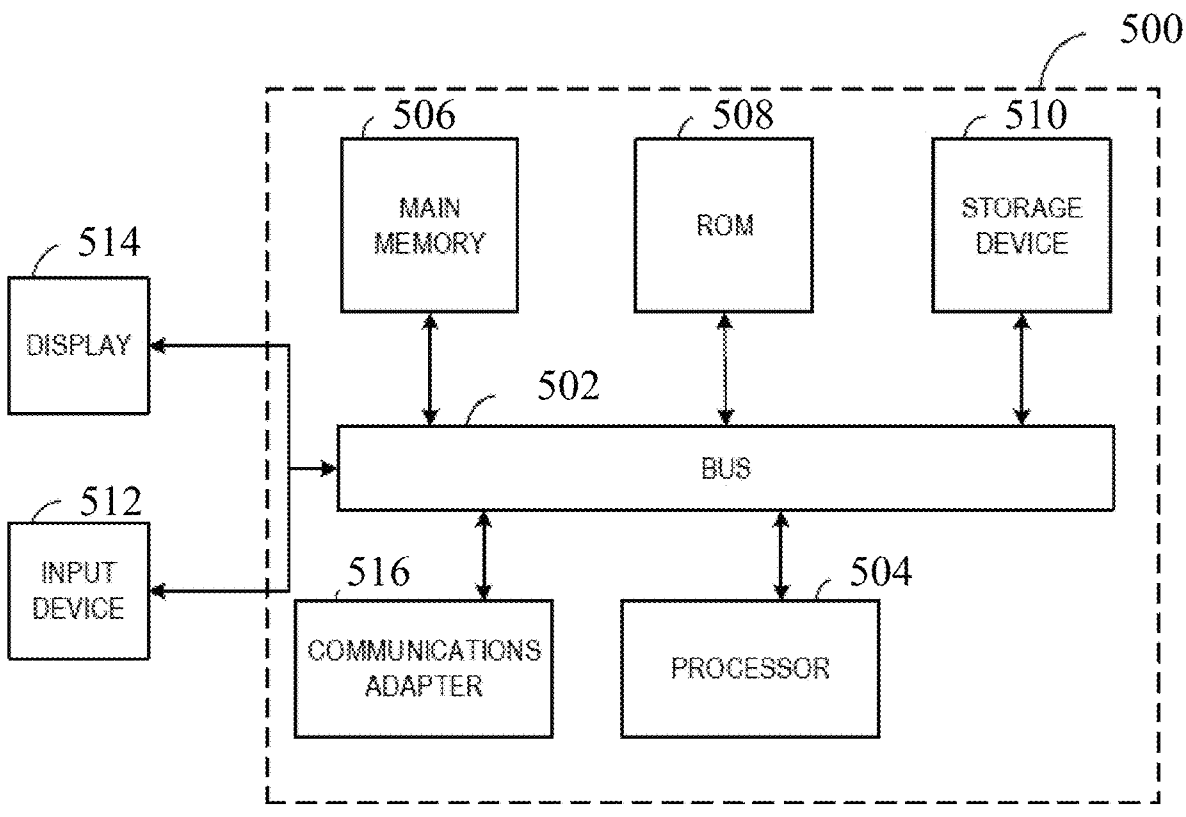
FIG. 5 illustrates a component diagram of a computing system suitable for use in the various implementations described herein, according to an embodiment.

FIG. 5 is a component diagram of an example computing system suitable for use in the various implementations described herein, according to an example implementation. One or more steps of the methods and processes discussed herein can be performed by the computing system depicted in FIG. 5.

The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a ROM 508 or other static storage device coupled to the bus 502 for storing static information and instructions for the processor 504. A storage device 510, such as a solid-state device, magnetic disk, or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in main memory 506. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

receiving, by at least one processor, data associated with a plurality of messages transmitted via a network;

determining, by the at least one processor, a first network traffic lane associated with a first set of messages of the plurality of messages, and a second network traffic lane associated with a second set of messages of the plurality of messages, wherein determining each of the first network traffic lane and the second network traffic lane comprises:

determining, by the at least one processor, a fingerprint for each message of the plurality of messages based on a plurality of attributes obtained from a data string associated with a transport layer security (TLS) handshake between a first device and a second device; and assigning, by the at least one processor, each message to the first network traffic lane or the second network traffic lane based on the fingerprint;

determining, by the at least one processor, that the first set of messages is associated with an increased probability of being involved in a distributed denial of service (DDoS) attack; and causing, by the at least one processor, at least one remedial action to be performed for at least a portion of messages associated with the first network traffic lane based on the fingerprint and the first set of messages being associated with the increased probability of being involved in a DDoS attack, wherein the at least one remedial action is performed on a per-lane basis to avoid interruption of network lanes determined to not be involved in the DDoS attack.

2. The method of claim 1, wherein determining the fingerprint for each message of the plurality of messages based on the plurality of attributes for each message comprises:

concatenating, for each message of the plurality of messages and by the at least one processor, identifiers for each attribute of the plurality of attributes to form the fingerprint.

3. The method of claim 1, wherein attributes of the set of attributes comprise one or more of:

a transport layer security (TLS) fingerprint associated with one or more messages exchanged during an initial handshake involving a client device and a server, a header fingerprint associated with data packets exchanged between the client device and the server;

cookie fingerprints associated with one or more cookies stored by the client device; or individual fingerprints associated with the client device.

4. The method of claim 1, wherein the first network traffic lane is associated with a first fingerprint type, and wherein the second network traffic lane is associated with a second fingerprint type, wherein determining the first set of messages comprises: associating, by the at least one processor, each message of the plurality of messages having a fingerprint associated with the first fingerprint type with the first set of messages; and wherein determining the second set of messages comprises: associating, by the at least one processor, each message of the plurality of messages having a fingerprint associated with the second fingerprint type with the second set of messages.

5. The method of claim 1, wherein determining that the first set of messages is associated with an increased probability of being involved in the DDoS attack comprises:

determining that an amount of messages associated with the first set of messages satisfies a threshold representing an unusual amount of network traffic for the first network traffic lane during a period of time.

6. The method of claim 1, wherein receiving the data associated with the plurality of messages transmitted via the network comprises:

receiving the data associated with the plurality of messages transmitted via the network by at least one reverse proxy server.

7. The method of claim 1, further comprising:

determining that one or more messages of the messages associated with the first network traffic lane include unique identifiers established for client devices that transmitted the one or more messages; and forgoing the at least one remedial action to be performed for a subset of messages associated with the first network traffic lane based on the presence of the unique identifier in the messages.

8. A system comprising:

a non-transitory machine-readable storage medium and one or more processors configured to:

receive data associated with a plurality of messages transmitted via a network;

determine a first network traffic lane associated with a first set of messages of the plurality of messages, and a second network traffic lane associated with a second set of messages of the plurality of messages, wherein determining each of the first network traffic lane and the second network traffic lane comprises:

determining, by the at least one processor, a fingerprint for each message of the plurality of messages based on a plurality of attributes obtained from a data string associated with a transport layer security (TLS) handshake between a first device and a second device; and assigning, by the one or more processors, each message to the first network traffic lane or the second network traffic lane based on the fingerprint;

determine that the first set of messages is associated with an increased probability of being involved in a distributed denial of service (DDoS) attack; and cause at least one remedial action to be performed for at least a portion of messages associated with the first network traffic lane based on the first set of messages being associated with the increased probability of being involved in a DDoS attack, wherein the at least one remedial action is performed on a per-lane basis to avoid interruption of network lanes determined to not be involved in the DDoS attack.

9. The system of claim 8, wherein the one or more processors configured to determine the fingerprint for each message of the plurality of messages based on the plurality of attributes for each message are configured to:

concatenating, for each message of the plurality of messages, identifiers for each attribute of the plurality of attributes to form the fingerprint.

10. The system of claim 8, wherein attributes of the set of attributes comprise one or more of:

a transport layer security (TLS) fingerprint associated with one or more messages exchanged during an initial handshake involving a client device and a server, a header fingerprint associated with data packets exchanged between the client device and the server;

cookie fingerprints associated with one or more cookies stored by the client device; or individual fingerprints associated with the client device.

11. The system of claim 8, wherein the first network traffic lane is associated with a first fingerprint type, wherein the second network traffic lane is associated with a second fingerprint type, wherein the one or more processors configured to determine the first set of messages are configured to: associate each message of the plurality of messages having a fingerprint associated with the first fingerprint type with the first set of messages; and wherein the one or more processors configured to determine the second set of messages are configured to: associate each message of the plurality of messages having a fingerprint associated with the second fingerprint type with the second set of messages.

12. The system of claim 8, wherein the one or more processors configured to determine that the first set of messages is associated with an increased probability of being involved in the DDoS attack are configured to:

determine that an amount of messages associated with the first set of messages satisfies a threshold representing an unusual amount of network traffic for the first network traffic lane during a period of time.

13. The system of claim 8, wherein the one or more processors configured to receive the data associated with the plurality of messages transmitted via the network are configured to:

receive the data associated with the plurality of messages transmitted via the network by at least one reverse proxy server.

14. The system of claim 8, wherein the one or more processors are further configured to:

determine that one or more messages of the messages associated with the first network traffic lane include unique identifiers established for client devices that transmitted the one or more messages; and forgo the at least one remedial action to be performed for a subset of messages associated with the first network traffic lane based on the presence of the unique identifier in the messages.

15. A non-transitory machine-readable storage medium having computer-executable instructions stored thereon that, when executed by one or more processors, cause the one or more processors to:

receive data associated with a plurality of messages transmitted via a network;

determine a first network traffic lane associated with a first set of messages of the plurality of messages, and a second network traffic lane associated with a second set of messages of the plurality of messages, wherein determining each of the first network traffic lane and the second network traffic lane comprises:

determining, by the at least one processor, a fingerprint for each message of the plurality of messages based on a plurality of attributes obtained from a data string associated with a transport layer security (TLS) handshake between a first device and a second device; and assign each message to the first network traffic lane or the second network traffic lane based on the fingerprint;

determine that the first set of messages is associated with an increased probability of being involved in a distributed denial of service (DDoS) attack; and cause at least one remedial action to be performed for at least a portion of messages associated with the first network traffic lane based on the first set of messages being associated with the increased probability of being involved in a DDoS attack, wherein the at least one remedial action is performed on a per-lane basis to avoid interruption of network lanes determined to not be involved in the DDoS attack.

16. The non-transitory machine-readable storage medium of claim 15, wherein the instructions that cause the one or more processors to determine the fingerprint for each message of the plurality of messages based on the plurality of attributes for each message cause the one or more processors to:

concatenate, for each message of the plurality of messages, identifiers for each attribute of the plurality of attributes to form the fingerprint.

17. The non-transitory machine-readable storage medium of claim 15, wherein attributes of the set of attributes comprise one or more of:

a transport layer security (TLS) fingerprint associated with one or more messages exchanged during an initial handshake involving a client device and a server, a header fingerprint associated with data packets exchanged between the client device and the server;

cookie fingerprints associated with one or more cookies stored by the client device; or individual fingerprints associated with the client device.

* * * * *